US005563655A

United States Patent [19]
Lathrop

[11] Patent Number: 5,563,655
[45] Date of Patent: Oct. 8, 1996

[54] INTELLIGENT DIGITAL IMAGE STORAGE FOR AN ELECTRONIC CAMERA

[75] Inventor: George E. Lathrop, Dansville, N.Y.

[73] Assignee: Eastman Kodak Company, Rochester, N.Y.

[21] Appl. No.: 202,538

[22] Filed: Feb. 28, 1994

[51] Int. Cl.$^6$ .................. H04N 5/30; H04N 5/76
[52] U.S. Cl. .................. 348/231; 348/232; 348/233; 348/714; 358/335; 386/117
[58] Field of Search .................. 348/207, 208, 348/222, 231, 232, 233, 714–719; 358/335; 382/232, 234; H04N 5/30, 5/76, 5/761

[56] References Cited

U.S. PATENT DOCUMENTS

| | | |
|---|---|---|
| 4,420,773 | 12/1983 | Toyoda et al. . |
| 4,456,931 | 6/1984 | Toyoda et al. . |
| 4,887,161 | 12/1989 | Watanabe et al. . |
| 4,901,160 | 2/1990 | Kinoshita et al. . |
| 4,907,231 | 3/1990 | Watanabe et al. . |
| 5,016,107 | 5/1991 | Sasson . |
| 5,018,017 | 5/1991 | Sasaki et al. . |
| 5,027,214 | 6/1991 | Fujimori . |
| 5,040,068 | 8/1991 | Parulski et al. . |
| 5,055,930 | 10/1991 | Nagasaki et al. . |
| 5,093,731 | 3/1992 | Watanabe et al. . |
| 5,138,459 | 8/1992 | Roberts et al. ........... 348/232 |
| 5,138,503 | 8/1992 | Nishida .................. 348/233 |
| 5,153,729 | 10/1992 | Saito .................... 348/232 |
| 5,153,730 | 10/1992 | Nagasaki et al. ......... 348/231 |
| 5,231,501 | 7/1993 | Sakai ................... 348/231 |
| 5,386,539 | 1/1995 | Nishi ................... 395/425 |

OTHER PUBLICATIONS

PCMCIA "PC Card Standard", Release 2.0, September 1991.
USSN 07/868,163; filed Apr. 14, 1992. Entitled "Memory Card with Programmable Interleaving". Inventors: James F. Heiberger, David A. Smith.

Primary Examiner—John K. Peng
Assistant Examiner—Glenton B. Burgess
Attorney, Agent, or Firm—David M. Woods

[57] ABSTRACT

A digital storage device is detachably connectable to an electronic camera of the type that generates an image signal and provides the image signal to an output connection on the camera. The digital storage device includes an algorithm memory for storing a plurality of algorithms for processing the image signal, a signal interface for transmitting signals between the storage device and the output connection on the camera, and a processor responsive to write command signals from the camera provided through the signal interface for selecting one of the algorithms stored in the algorithm memory. The processor then generates a processed image signal by applying the selected algorithm to the image signal provided through the interface, and stores the processed image signal in an image memory section in the storage device.

43 Claims, 4 Drawing Sheets

INTELLIGENT DIGITAL IMAGE STORAGE FOR AN ELECTRONIC CAMERA

FIELD OF INVENTION

This invention pertains to the field of electronic imaging and, more specifically, to image storage in an electronic still camera capable of capturing and storing images in a removable digital image storage device.

BACKGROUND OF THE INVENTION

The present trend in image storage is to use removable digital image storage devices that are generally useful as mass storage devices for digital computers. Such storage devices are not specifically adapted to the storage of image data and, indeed, may be used for storage of any kind of electronic data, including database information, word processor documents, software programs, etc. An example is the PC Memory Card adapted to the PCMCIA PC Card Standard—Release 2.0, published by the Personal Computer Memory Card International Association, Sunnyvale, Calif., September 1991. If such a memory card is used with an electronic camera, image data would be configured by the electronic camera to match the card interface standard, and then loaded into the card by a hardware interface that supports the card.

A variation on this memory concept is shown in U.S. Pat. No. 5,018,017, wherein image-specific information (e.g., exposure value, shutter speed) and camera-specific information (e.g., imaging system, compression mode in use) is loaded into a directory on the memory card. Patent application Ser. No. 868,163, "Memory Card with Programmable Interleaving" filed Apr. 14, 1992 by common assignee with the present application, goes beyond the above proposal by having a control circuit on the card for storing an interleave factor input from a host system for specifying the manner in which data is distributed among plural memory devices on the card. By varying the interleave factor, the host system can relate the data transfer rate to the particular application—i.e., if the host system is a personal computer the interleave factor can be small (or not used) as slow transfer rates are acceptable, but if the host system is a high resolution camera the interleave factor can be increased to provide real time transfer rates. A further image-specific example is shown in U.S. Pat. No. 4,887,161, wherein a memory card has a display and a processor for fetching stored images and putting them up on the display. (The processor also responds to a cancel input from the camera to erase unwanted images.)

Given the aforementioned trend toward PCMCIA-style memory cards, and despite some proposals for image-specific capabilities in digital storage devices, it remains the responsibility of the electronic camera to configure and manipulate the image data into a form suitable for storage. Because an image is described by a large amount of binary data, sometimes megabytes of data, it is a particular responsibility of the camera to compress and otherwise transform the data for storage. For instance, this may involve manipulation of color-spaces and image detail. As a result, the data in the digital storage device is only intelligible to a camera (or processor) of the type that originally configured and manipulated the data. What is needed is a storage technique that retains the advantages of present techniques, but presents a digital storage device as a generic device to a variety of camera and processor types.

SUMMARY OF THE INVENTION

By providing a digital storage device having innate intelligence or capabilities that are specific to imagery, e.g., color spaces or compression, it is possible to confine the handling and manipulation of the image data to the storage device itself, in effect having the storage device appear as a "black box" to the outside world. Images are captured by an electronic camera and written to the storage device without the camera having to be responsible for the logistics involved in the manipulation and storage of the image data. Subsequently, when image data is read out of the storage device, it is the responsibility of the storage device to manifest the image to the image reader in its original form, or in some other form dependent upon the desired capability of the storage device.

Accordingly, the invention includes a digital storage device detachably connectable to an electronic camera of the type that generates an image signal and provides the image signal to an output connection on the camera. The digital storage device includes an algorithm memory for storing a plurality of algorithms for processing the image signal, a signal interface for transmitting signals between the storage device and the output connection on the camera, a processor responsive to write command signals from the camera provided through the signal interface for selecting one of the algorithms stored in the algorithm memory and for generating a processed image signal by applying the selected algorithm to the image signal provided through the interface, and an image memory section for storing the processed image signal.

The advantageous effect of the invention over the use of a commonly available computer storage medium is found in two main areas: (1) the capturing device does not have to provide the usual logistics for storing the image data onto the physical medium; and (2) the capturing device does not have to handle the actual image processing, such as compression, that may be needed to store the image data. This "black box" approach also relieves reading devices from the responsibility of logistical retrieval of image data from the physical medium, as well as decompression of the image data if it was compressed for storage. Furthermore, this "black box" approach provides consistency of image quality in regard to storage as well as later retrieval for display or printing by providing uniform image manipulation in the storage device itself. An intelligent image storage concept will also aid in the standardization of electronic image storage for electronic capture devices, because all an electronic camera has to do is to adhere to the interface specification of the image storage device. Consequently, various image storage devices with different capabilities will all function with cameras adapted for the common interface.

BRIEF DESCRIPTION OF THE DRAWINGS

The invention will be described in relation to the drawings, wherein.

DESCRIPTION OF THE PREFERRED EMBODIMENTS

Because electronic cameras employing CCD sensors and digital storage devices are well known, the present description will be directed in particular to elements forming part of, or cooperating more directly with, apparatus in accordance with the present invention. Elements not specifically shown or described herein may be selected from those known in the art. Moreover, while the drawings are intended to show an example of an embodiment, other interface types and embodiments are possible and are expected to be within the scope of the invention. While the described embodiment illustrates application of the concept to a still camera, the intelligent storage concept could be equally well used as the storage medium for digital motion with an electronic motion camera.

Figure 1:
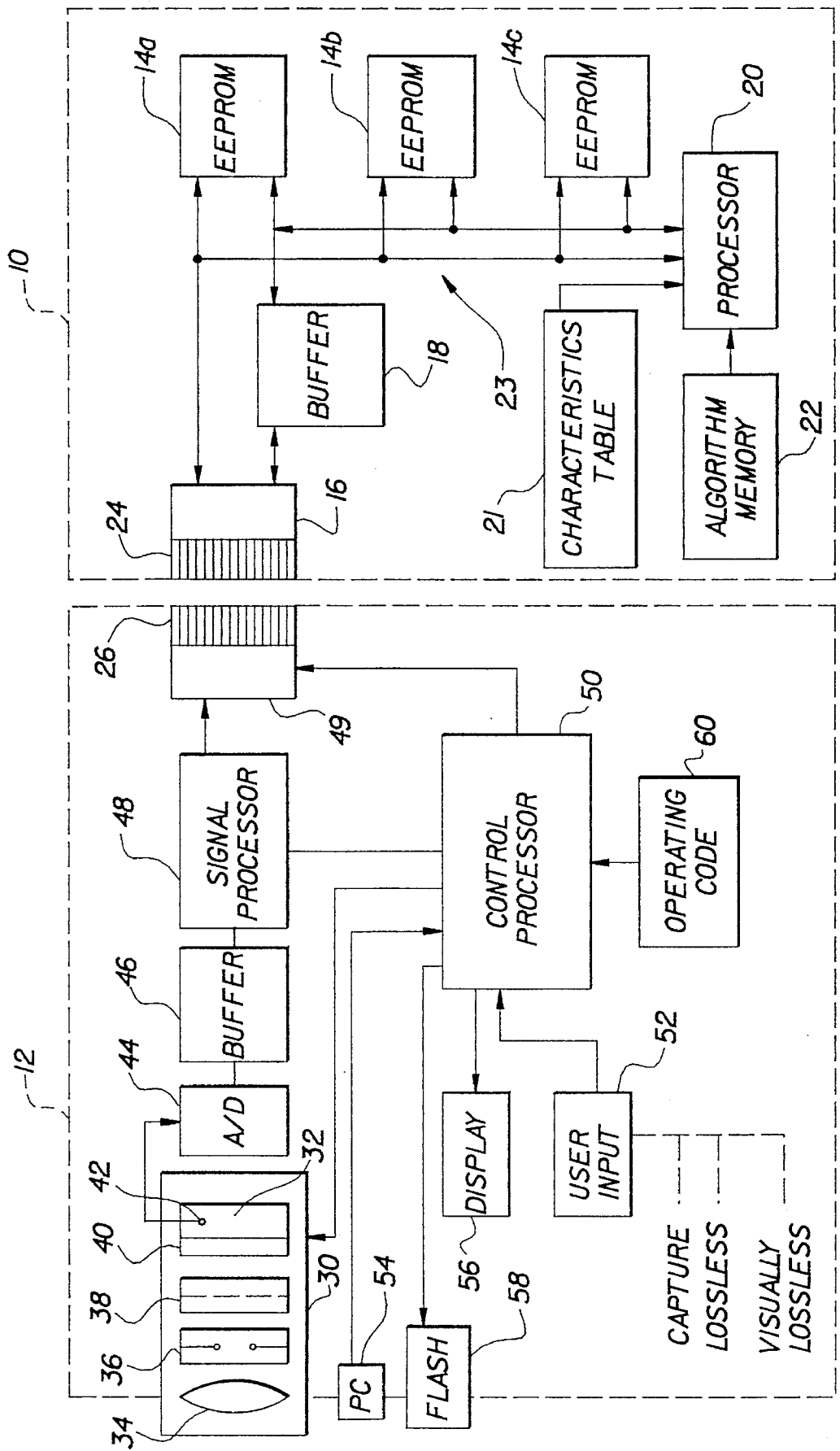
FIG. 1 is a diagram of an electronic imaging system including an electronic camera and an intelligent digital storage device configured according to the invention.

Referring initially to FIG. 1, the invention is shown as intelligent storage for an electronic still camera 12. Various types of storage devices may be used for this purpose, based on, for example, EEPROM memory, FLASH memory, static RAM memory, dynamic RAM memory, magnetic memory (floppy or hard), optical memory, and so on. More specifically for the illustrated embodiment, the intelligent storage device is a memory card 10 utilizing solid state integrated circuit memory. (An attractive alternative is a similarly-shaped storage card containing a hard magnetic drive.) The memory card 10 includes a plurality of non-volatile EEPROM memory devices 14a, 14b, 14c for storing image data input to the card 10 through an input interface 16. (The showing of three EEPROM memory devices is merely illustrative; more are ordinarily employed. Likewise, a parallel interface is merely illustrative; other interfaces, such as serial, optical, etc., may be used.) The memory card 10 also includes a buffer 18 for latching interface address and control signals input through the interface 16, a programmable processor 20, a non-volatile algorithm memory 22, and a data bus 23 connecting the various elements. Characteristics of the card 10, as hereinafter described, are stored in a characteristic table 21. The input interface 16 includes a card edge connector 24 that is configured to mate with a corresponding camera edge connector 26 on the camera 12.

The electronic still camera 12 includes an exposure section 30 for directing light from a subject (not shown) toward an image sensor 32. The exposure section includes conventional optics 34 for directing the image light through a diaphragm 36, which regulates the optical aperture, and a shutter 38, which regulates exposure time. The sensor 32, which includes a two-dimensional array of photosites corresponding to picture elements of the image, is a conventional charge-coupled device (CCD) using either well-known interline transfer or frame transfer techniques. The sensor 32, which is covered by a color filter array 40, is exposed to image light so that analog image charge information is generated in respective photosites. The charge information is applied to an output section 42, which converts the charge information to analog image signals corresponding to respective picture elements. The analog image signals are applied to an analog/digital (A/D) converter 44, which generates a digital image signal from the analog input signal for each picture element.

The digital signals are applied to an image buffer 46, which is a random access memory (RAM) with storage capacity for at least one image. The stored signals are applied to a digital signal processor 48, which provides signal correction for white balance and gamma adjustment, and from there to an output interface 49. A control processor 50 generally initiates and controls exposure by operating the diaphragm 36 and the shutter 38, and by generating the horizontal and vertical clocks needed for driving the sensor 32 and clocking image data therefrom. The control processor 50 receives instructions from a user input section 52, including the capture command and, e.g., the choice of compression algorithm to be employed. (As will be described, other algorithm choices, such as for color space, may also be allowed.) The control processor 50 also receives exposure conditions from the photocell 54 and provides a reading of operational conditions to a display device 56. The display device 56 can also be used to display the available functions provided by the card 10, and the selection of the desired function (or functions) can be made from the user input section 52. Depending on exposure conditions, a flash unit 58 may be operated by the processor 50. The operating code for the camera 12 is stored in ROM memory 60.

In operation, the control processor 50 initiates a picture taking sequence in response to a capture command from the user input section 52. The aperture is set by the diaphragm 36 and the proper exposure time is selected for the shutter 38 according to information about ambient light data received through the photocell 54, or about the use of the flash unit 58. The resulting image is read out of the image sensor 32, converted to a digital signal in the A/D converter 44 and processed in the digital signal processor 48 for storage in the memory card 10. Appropriate control signals are placed on the output interface 49 by the control processor 50. In accordance with the invention, certain of the control signals indicate the type of processing that the memory card 10 is directed to do. For instance, distinct control signals are applied to the interface 49 for the selection of either lossless, or visually lossless, compression from the user input section 52. Other control signals indicate whether a write, read or an erase operation is to proceed. The control signals also specify that data is being asserted on the data lines, with more specific addressing being left to the processor 20 in the memory card 10.

The image card 10 has two basic functions: a write function and a read function. Write functions, as used herein, refer to commands that would otherwise alter the state of the card 10, whereas read functions are non-destructive in nature. These functions are shown respectively in FIGS. 2A, 2B and 3 in the form of flow diagrams. The "write-image" functions allow an image of a specified resolution to be stored onto the image card 10. In this embodiment, the "write-image" functions are of two types: "write-image lossless" and "write-image visually lossless". Besides "write-image" functions (lossless or visually lossless), the write function also includes certain management type functions, such as "erase image card" and "selective image erase", as appropriate depending on the capabilities provided by the image card. Besides the "read image" function, the read function includes certain management functions, such as "read image card characteristics" and "read image count." The read functions can be activated from the camera 12 or from a reader device, such as a player, printer, display, or the like. The number of card functions, including management type functions, is variable; for purposes of this embodiment, the functions include the following:

A. Write Functions

1. The "write-image lossless" function specifies that the image is to be stored in such a way that the image can be later reconstructed without any data loss whatsoever, i.e., totally and mathematically lossless. The code for a lossless algorithm is stored in the algorithm memory 22. An example of lossless encoding is run-length encoding, which is a method of data compression that encodes strings of the same character as a single number. Some imaging applications may be very sensitive to having their images compressed or altered, as is the case with medical applications. In these applications, the camera 12 would store images in a totally lossless manner. The camera 12, however, would only apply a control signal to the output interface 49 indicating, pursuant to input from the user input 52, that a lossless compression algorithm is to be employed in the memory card 10. Upon receiving such a control signal, the processor 20 retrieves a lossless algorithm from the algorithm memory 22 and accordingly compresses the input digital image signals and stores the compressed signals in the EEPROMs 14a, 14b, 14c.

2. The "write-image visually lossless" function stores the image in such a way that the image can be later reconstructed in a visually lossless manner, i.e., with a visually acceptable level of loss. Examples of visually-lossless encoding include compression techniques using the discrete cosine transform and differential pulse code modulation. This option may either be a command from the camera 12 or a suggestion to the image card, depending on its available storage space; in the latter case, when storage capacity is adequate the image card may choose to store the image using the "write-image lossless" method (as this option will also allow for the reconstruction of the image in a visually lossless manner). As with the lossless function, a proper control signal to the card causes the processor 20 to retrieve a visually lossless compression algorithm from the algorithm memory 22 and to accordingly process the input digital image signals. The particular type of image compression that may be used with either function is thus transparent to the outside world due to the "black box" approach this technique.

3. The "erase image card" function is used to reinitialize an image card to a state in which it no longer contains any image data whatsoever. Code for the erase function is also stored in the algorithm memory 22 and accessed pursuant to an erase command from the camera.

4. The "selective image erase" function is used to selectively erase one image from the image card and to free up the space for another image to be stored at a later time. Code for this function is also stored in the algorithm memory 22.

B. Read Functions

1. The "read-image" function allows a specified image contained on the image card 10 to be transferred from the image card 10 to the camera 12—or to other reader devices (not shown), such as displays, printers, etc. It is the responsibility of the image card to perform whatever image data reconstruction that may be necessary to deliver the image data to the camera using the image's color space. In particular, the "read image" signal causes the processor 20 to access the appropriate decompression algorithm from the algorithm memory 22; decompression then takes place on the card 10, and the decompressed data is read from the card 10 to the camera 12 through the respective interfaces 16 and 49. Since no form of compressed image data is read from the image card, the card is essentially generic to a broad range of capture and processing devices.

2. The "read image card characteristics" function is used to determine the image card capabilities in regard to the image storage and processing functionality of the particular image card in use. The card characteristics are contained in the characteristics table 21 and accessed pursuant to a command through the interface 16. The types of information provided by this function include: 1) a listing of the supported functions, such as the type of color space, output rendering, compression, etc. that is supported; 2) the data transfer rate; and 3) the supported "image characteristic" bytes. In one utilization of this function, the list of supported functions could be read from the table 21 by the control processor 50 and shown on the display 56 in the camera 12. Then the camera (or reader) user would select the appropriate function and the card 10 would accordingly process the image data.

3. The "read image count" function is used to allow the camera 12 (or reader) to determine the number of images currently stored on the image card 10. Code for this function is also stored in the algorithm memory 22.

Figure 2A:
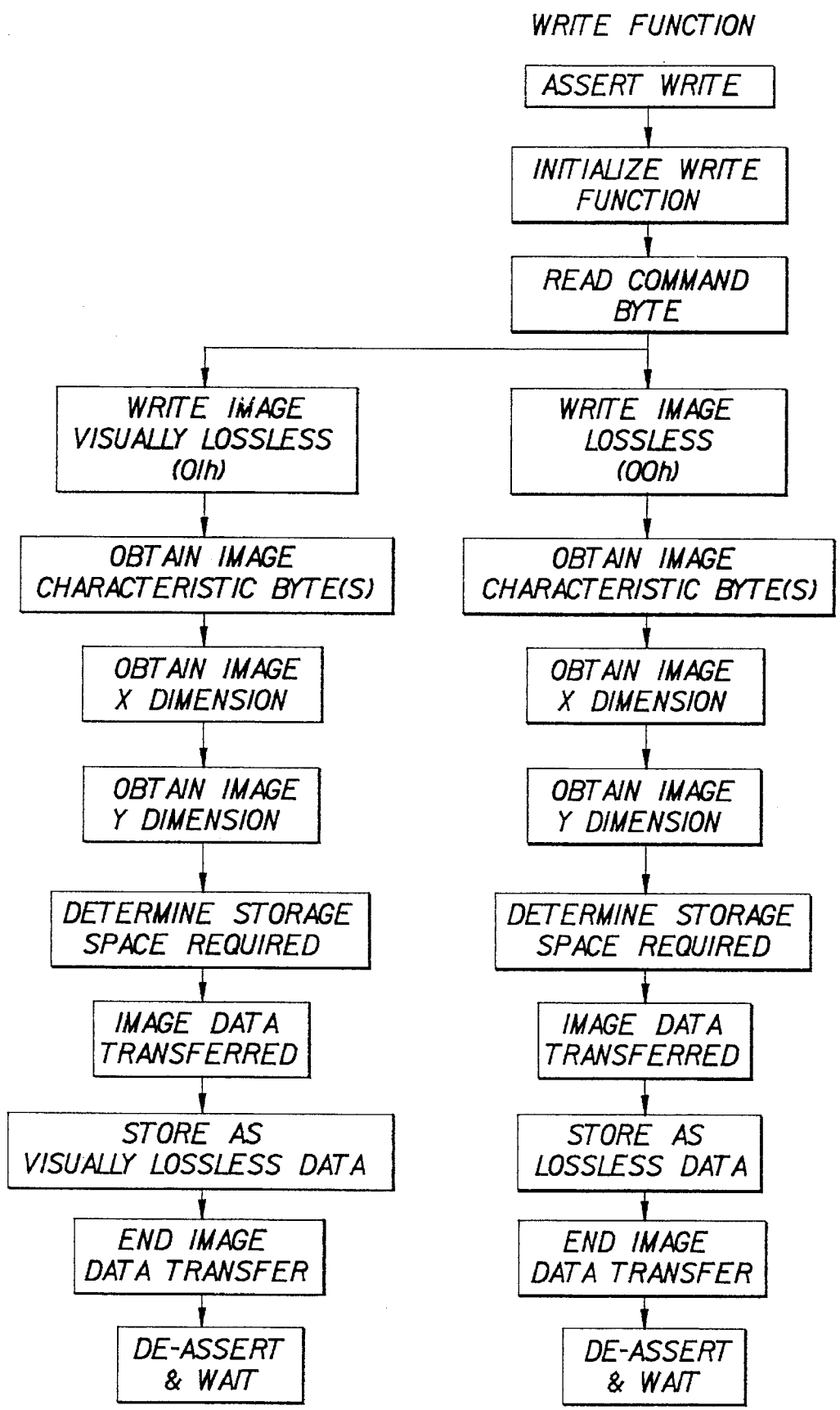
FIGS. 2A and 2B are flow diagrams showing the several write functions supported by the digital storage device shown in FIG. 1.
Figure 2B:
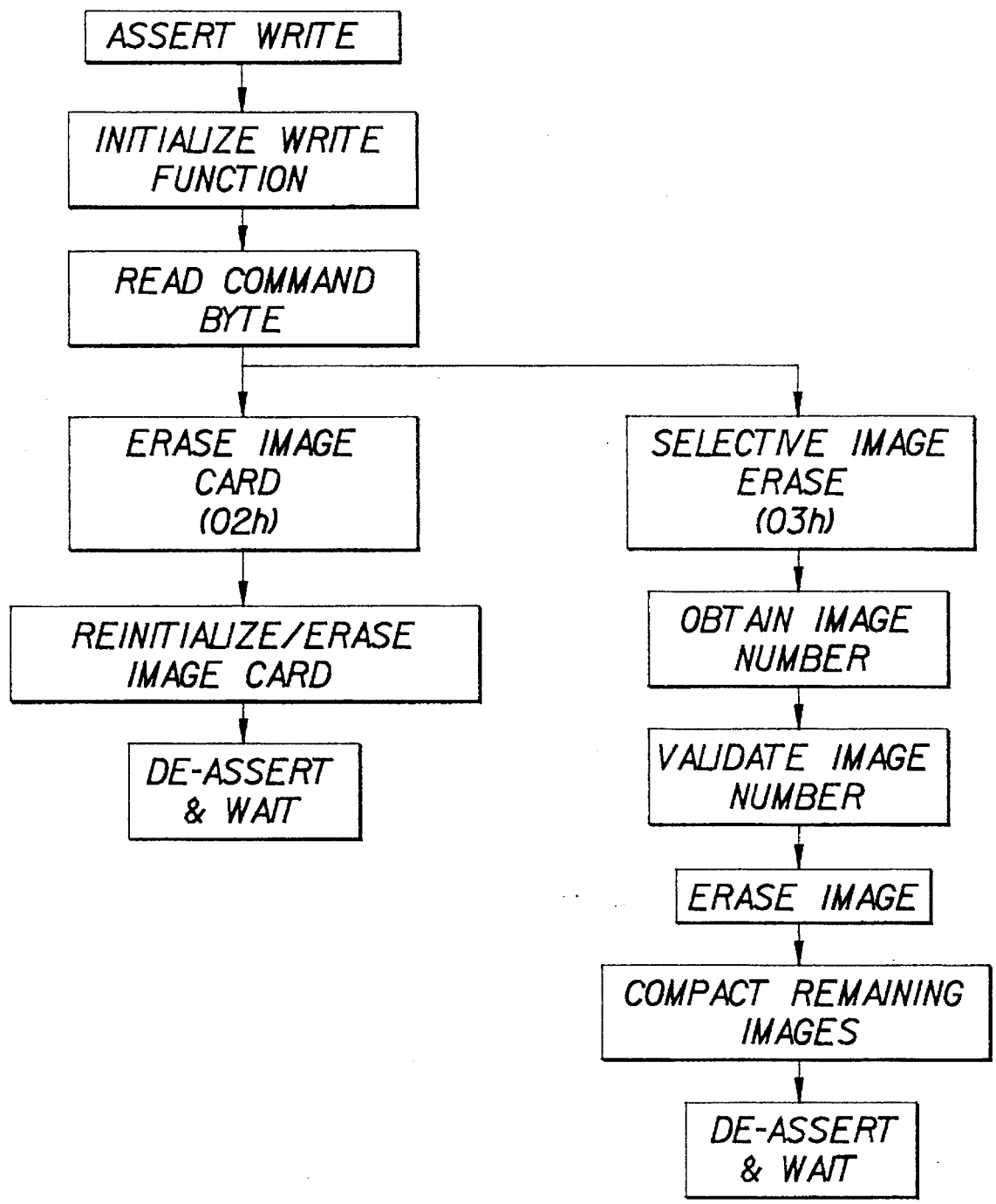
Figure 3:
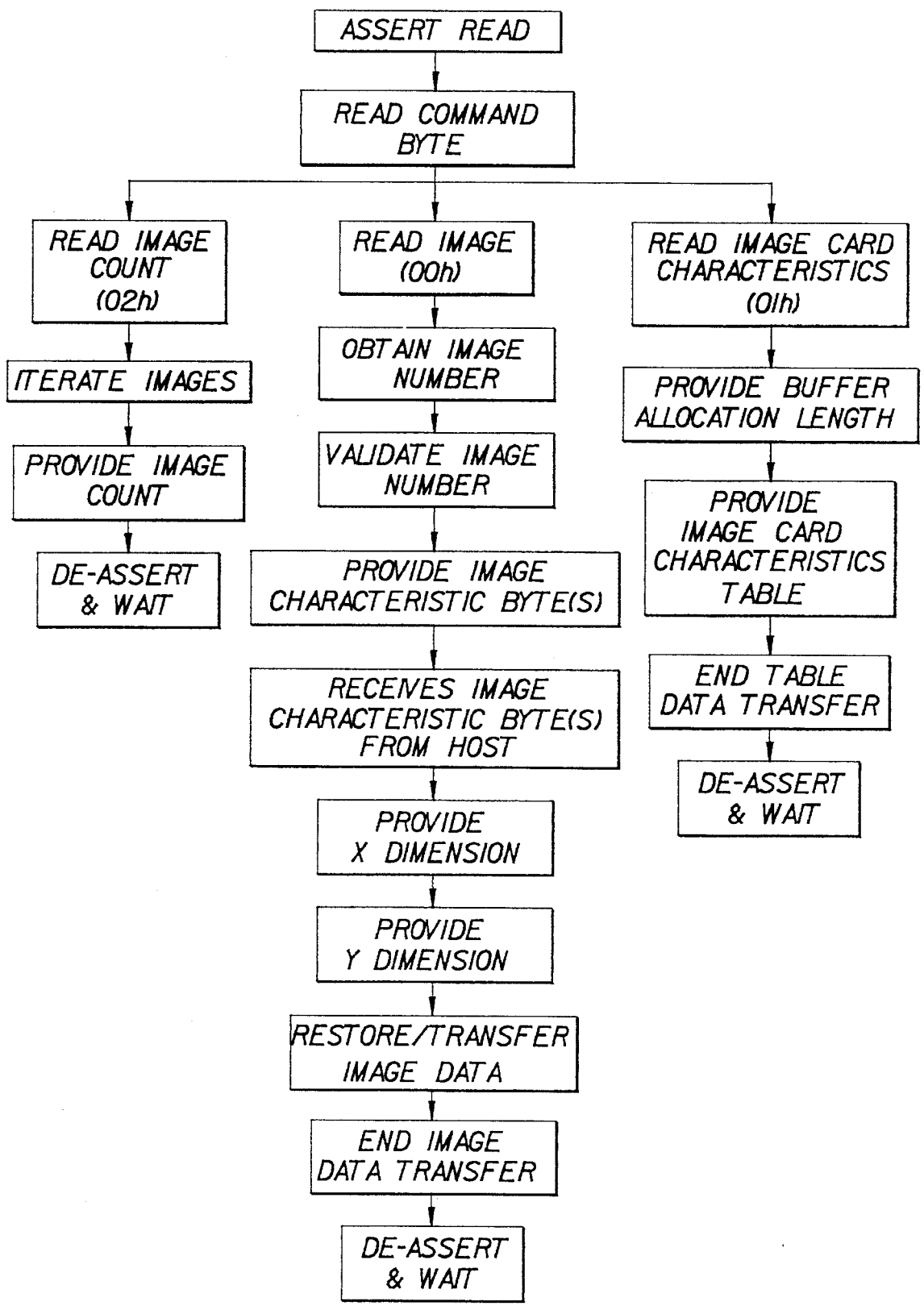
FIG. 3 is a flow diagram showing the several read functions supported by the digital storage device shown in FIG. 1.

These card functions are generally diagrammed for their functional flow in FIGS. 2A, 2B, and 3. In each case, a command byte is transmitted over the interface 16 and read by the processor 20. Although the command bytes could take many forms, they are shown in the flow diagrams as follows:

| A. With "write" asserted | |
| --- | --- |
| write image lossless | 00h |
| write image visually lossless | 01h |
| erase image card | 02h |
| selective image erase | 03h |
| B. With "read" asserted | |
| read image | 00h |
| read card characteristic | 01h |
| read image count | 02h |

Given the appropriate combination of asserts and commands, the selected function is performed. For instance, the write lossless and visually lossless functions both obtain an image characteristic byte(s) from the camera, which allows the camera to specify the type of image data that is being presented to the image card, i.e., the color space used and the number of bytes per image pixel. The image characteristic byte(s) is then stored on the card. Then the image X and Y dimensions are obtained, from which the required storage space is determined. Image data is then transferred and stored as either lossless or visually-lossless data, depending upon which algorithm has been requested. The write-based erase functions operate as described in FIG. 2B, with particular attention to selective image erase, where the erasure is confined to an image number obtained from the camera and the remaining images are compacted together following the erasure. The read image function reverses the write function, first obtaining the desired image number from the camera (or reader), then providing the image characteristic byte and the X-Y dimensions to the camera (or reader). Finally, the image data is restored by appropriate de-compression or other processing and transferred to the camera (or reader).

The image card 10 and its interface 16 is designed to specifically store only image-related data. An exemplary image data format that can be presented to the image card is 24-bit RGB (red, green, blue) data of any of several known color spaces. This image data format may encompass more color density or different amounts of color data, as well as different color spaces to accommodate various applications. Within this format, the image card interface 16 allows the storage and retrieval of 24-bit RGB image data of a specified image size, that is, a specified X and Y dimension. The color space of the image data at the image card interface is specified via the "card characteristics" table 21 and may be different for application-specific image card versions or models. In other words, the "card characteristic" table 21 will determine which color spaces are supported by the card. Examples of color spaces include the "Photo YCC" space (published by the Eastman Kodak Co., Rochester, N.Y. and used in their Photo CD system), or the standard color spaces widely known in the art as CCIR 709, CIE Lab, or CIE Luv. The image card will assume that the image data is being presented to it in the selected/specified color space and the image card will reconstruct images within this color space upon being retrieved, unless otherwise commanded. If so commanded, the card 10 will retrieve a selected color space algorithm from the algorithm memory 22 and accordingly convert the image data to the new color space.

The algorithm memory 22 in the card 10 may also contain specific algorithms for rendering the stored image data, that is, for processing the image data in anticipation of a particular output path or type of utilization. For example, the image data stored on the card may be rendered for a particular output printing device operating in a particular color space. In that case, an additional write function would be provided, e.g., "store rendered for specific output". A control signal to that effect would be issued by the control processor 50 and the appropriate rendering algorithm would be retrieved from the algorithm memory 22 to transform the incoming image data into a form suitable for a particular output device.

On-card processing of the image data is performed by the processor 20, using power from the camera; such processing is substantially transparent to the camera and its user. Such "black-box" processing of the image data for compression, color space transformation, color rendering, and so on, may occur immediately upon receipt by the card 10, or the processing may be delayed. The amount of delay may depend upon the card's requirements or the type of processing required. For instance, processing may occur immediately upon image capture and storage, or processing may be delayed until the camera is no longer in the "ready" mode awaiting a capture instruction. Processing may even be further delayed until the card 10 is off-line and unattached to the camera. In the latter case, the card 10 would have its own power source for driving the processor 20 and the other components on the card.

The image card allows the storage of images with varying resolution. When writing an image to the image card the image's X and Y dimensions are provided. When reading an image from the image card the image card will provide to the host the image's X and Y dimensions prior to the image data transfer. Other options for reading an image include reading of an image from the card 10 in a subsampled or scaled manner. For example, the read function may include a "cropped read" instruction that directs the processor 20 to retrieve a particular subsampling algorithm from the algorithm memory 22 and to accordingly subsample the stored image data.

Given a 24-bit RGB type of image capture format, a pixel of image data is made up of red (8-bits), green (8-bits), and blue (8-bits) data in that order. This 3-byte sequence is referred to as an RGB-triplet. A typical writing/reading sequence is as follows. While writing image data to the image card, the host camera provides the RGB-triplet data starting at the image's upper-left corner and traversing left-to-right and top-to-bottom. While reading image data from the image card to the host camera, the image card provides the RGB-triplet data starting at the image's upper-left corner and also traversing left-to-right and top-to-bottom. The data bus 23 of the image card 10 is, e.g., 8-bits parallel with additional control lines allowing for high speed data transfers. The maximum data transfer rates may vary from one image card version/model to another.

The invention has been described in detail with particular reference to a presently preferred embodiment, but it will be understood that variations and modifications can be effected within the spirit and scope of the invention. For instance, the type of technology used to connect the image card to the camera 12 may be a metal pin/socket as implied in FIG. 1 or may be optical in nature. Another alternative is an high speed serial interface. This list of interface types is not exhaustive and may include other types. Furthermore, while the algorithm memory 22 is implied to have a certain number of stored algorithms, it is expected that the memory 22 may be updated from an appropriate host processor through a write-protected function in order to change the existing algorithms or to add new functionality over time.

PARTS LIST

10 MEMORY CARD
12 ELECTRONIC STILL CAMERA
14a, 14b, 14c MEMORY DEVICES
16 INTERFACE
18 BUFFER
20 PROGRAMMABLE PROCESSOR
21 CHARACTERISTICS TABLE
22 ALGORITHM MEMORY
23 DATA BUS
24 CARD EDGE CONNECTOR
26 CAMERA EDGE CONNECTOR
30 EXPOSURE SECTION
32 IMAGE SENSOR
34 OPTICS
36 DIAPHRAGM
38 SHUTTER
40 COLOR FILTER ARRAY
42 OUTPUT SECTION
44 A/D CONVERTER
46 IMAGE BUFFER
48 DIGITAL SIGNAL PROCESSOR
49 OUTPUT INTERFACE
50 CONTROL PROCESSOR
52 USER INPUT SECTION
54 PHOTOCELL
56 DISPLAY DEVICE
58 FLASH UNIT
60 ROM MEMORY

What is claimed is:

1. A digital storage device detachably connectable to an electronic camera of the type that generates image signals corresponding to captured images and provides the image signals to an output connection on the camera for storage in the digital storage device, said device comprising:

an algorithm memory for storing a plurality of algorithms for processing the image signals;

a signal interface for transmitting the image signals between the device and the output connection on the camera according to a predetermined interface specification;

a processor responsive to write command signals from the camera provided through said signal interface for selecting one of the algorithms stored in said algorithm memory, and for generating processed image signals by applying the selected algorithm to the image signals provided through said signal interface, said selected algorithm processing the image signals for storage according to a particular configuration independent of the interface specification; and an image memory section for storing the processed image signals.

2. A digital storage device as claimed in claim 1 wherein said plurality of algorithms includes at least one compression algorithm.

3. A digital storage device as claimed in claim 2 wherein said compression algorithm includes a lossless algorithm for processing the image signal in such a way that the image can be later reconstructed without any data loss.

4. A digital storage device as claimed in claim 2 wherein said compression algorithm includes a visually lossless algorithm for processing the image signal in such a way that the image can be later reconstructed in a visually lossless manner.

5. A digital storage device as claimed in claim 1 wherein said plurality of algorithms further includes an erase algorithm for erasing one or more of the image signals stored in said image memory section.

6. A digital storage device as claimed in claim 1 wherein said device retains the identity of the algorithm used to process the image signal, and wherein said processor is responsive to a read command provided through said signal interface for selecting a particular processed image signal stored in said image memory section, and for restoring the processed image signal either to its original state as an image signal or to another processed state.

7. A digital storage device as claimed in claim 6 wherein the read command is provided by the camera.

8. A digital storage device as claimed in claim 6 wherein the storage device is further useful with a reader, and wherein the read command is provided by the reader.

9. A digital storage device as claimed in claim 1 wherein said device is a memory card and said image memory section includes integrated circuit memory.

10. A digital storage device as claimed in claim 1 wherein said image memory section includes a magnetic disk.

11. An image memory card detachably connectable to an electronic camera of the type that generates image signals corresponding to captured images and provides the image signals to an output connection on the camera for storage in the memory card, said image memory card comprising:

an algorithm memory for storing a plurality of algorithms for processing the image signals;

a signal interface for transmitting the image signals between the card and the output connection on the camera according to a predetermined interface specification;

a processor responsive to write command signals from the camera provided through said signal interface for selecting one of the algorithms stored in said algorithm memory, and for generating processed image signals by applying the selected algorithm to the image signals provided through said signal interface, said selected algorithm processing the image signals for storage according to a particular configuration independent of the interface specification; and an image memory section for storing the processed image signals.

12. An image memory card as claimed in claim 11 wherein said plurality of algorithms includes a plurality of compression algorithms.

13. An image memory card as claimed in claim 12 wherein one of said plurality of compression algorithms includes a lossless algorithm for processing the image signal in such a way that the image can be later reconstructed without any data loss.

14. An image memory card as claimed in claim 12 wherein one of said plurality of compression algorithms includes a visually lossless algorithm for processing the image signal in such a way that the image can be later reconstructed in a visually lossless manner.

15. An image memory card as claimed in claim 12 wherein said plurality of algorithms further includes an erase algorithm for erasing one or more of the image signals stored in said image memory section.

16. An image memory card as claimed in claim 11 wherein said card retains the identity of the algorithm used to process the image signal, and wherein said processor is responsive to a read command provided through said signal interface for selecting a particular processed image signal stored in said image memory section, and for restoring the processed image signal either to its original state as an image signal or to another processed state.

17. An image memory card as claimed in claim 16 wherein the read command is provided by the camera.

18. An image memory card as claimed in claim 16 wherein the card is further useful with a reader, and wherein the read command is provided by the reader.

19. An image memory card as claimed in claim 16 wherein said plurality of algorithms includes a plurality of compression algorithms, and wherein said processor is responsive to a read command provided through said signal interface for selecting a particular processed image signal stored in said image memory section, and for restoring the processed image signal by decompressing the processed image signal according to the inverse of the selected compression algorithm.

20. An image memory card as claimed in claim 19 wherein one of said plurality of compression algorithms includes a lossless algorithm for processing the image signal in such a way that the image can be later reconstructed without any data loss, and wherein said processor is responsive to a read command provided through said signal interface for selecting a particular processed image signal stored in said image memory section, and for restoring the processed image signal without any data loss.

21. An image memory card as claimed in claim 19 wherein one of said plurality of compression algorithms includes a visually lossless algorithm for processing the image signal in such a way that the image can be later reconstructed in a visually lossless manner, and wherein said processor is responsive to a read command provided through said signal interface for selecting a particular processed image signal stored in said image memory section, and for restoring the processed image signal approximately without any visual data loss.

22. A digital storage device detachably connectable to an electronic camera of the type that generates an image signal and provides the signal to an output connection on the camera, said device comprising:

an algorithm memory for storing a plurality of algorithms for processing the image signal, said algorithms representing the functional capabilities which the storage device will support;

a characteristics memory for storing a table of the functional capabilities of the storage device;

a signal interface for transmitting signals between the device and the output connection on the camera;

a processor responsive to 1) read command signals from the camera provided through said signal interface for transmitting the table in said characteristics memory to the camera for use therewith to select a desired functional capability, and 2) write command signals from the camera provided through said signal interface for selecting one of the algorithms stored in said algorithm memory corresponding to a desired functional capability, and for generating a processed image signal by applying the selected algorithm to an image signal provided through said signal interface; and an image memory section for storing the processed image signal.

23. A digital storage device as claimed in claim 22 wherein said plurality of algorithms includes at least one compression algorithm.

24. A digital storage device as claimed in claim 23 wherein said compression algorithm includes a lossless algorithm for processing the image signal in such a way that the image can be later reconstructed without any data loss.

25. A digital storage device as claimed in claim 23 wherein said compression algorithm includes a visually lossless algorithm for processing the image signal in such a way that the image can be later reconstructed in a visually lossless manner.

26. A digital storage device as claimed in claim 22 wherein said plurality of algorithms further includes an erase algorithm for erasing one or more of the image signals stored in said image memory section.

27. A digital storage device as claimed in claim 22 wherein said plurality of algorithms includes at least one color space transformation algorithm.

28. A digital storage device as claimed in claim 22 wherein the storage device is further useful with a reading device, and wherein said plurality of algorithms includes at least one algorithm for rendering the image signal for use by the reading device.

29. A digital storage device as claimed in claim 22 wherein said device retains the identity of the algorithm used to process the image signal, and wherein said processor is responsive to a read command provided through said signal interface for selecting a particular processed image signal stored in said image memory section, and for restoring the processed image signal either to its original state as an image signal or to another processed state.

30. A digital storage device as claimed in claim 29 wherein the read command is provided by the camera.

31. A digital storage device as claimed in claim 29 wherein the storage device is further useful with a reader, and wherein the read command is provided by the reader.

32. A digital storage device as claimed in claim 22 wherein said device is a memory card and said image memory section includes integrated circuit memory.

33. A digital storage device as claimed in claim 22 wherein said image memory section includes a magnetic disk.

34. A digital storage device as claimed in claim 22 wherein the storage device is further useful with a host processor, and wherein said algorithm memory is updated by said host processor by changing one or more of the stored algorithms, or by adding one or more new algorithms representing new functionality.

35. A digital storage device detachably connectable to an electronic camera of the type that generates an image signal and provides the signal to an output connection on the camera, said device comprising:

an algorithm memory for storing a plurality of algorithms for processing the image signal, including at least one compression algorithm;

a signal interface for transmitting signals between the device and the output connection on the camera;

a processor responsive to write command signals from the camera provided through said signal interface for selecting one of the algorithms stored in said algorithm memory, and for generating a processed image signal by applying the selected algorithm to an image signal provided through said signal interface; and an image memory section for storing the processed image signal.

36. A digital storage device as claimed in claim 35 wherein said compression algorithm includes a lossless algorithm for processing the image signal in such a way that the image can be later reconstructed without any data loss.

37. A digital storage device as claimed in claim 35 wherein said compression algorithm includes a visually lossless algorithm for processing the image signal in such a way that the image can be later reconstructed in a visually lossless manner.

38. A digital storage device as claimed in claim 35 wherein said plurality of algorithms further includes an erase algorithm for erasing one or more of the image signals stored in said image memory section.

39. A digital storage device as claimed in claim 35 wherein said device retains the identity of the algorithm used to process the image signal, and wherein said processor is responsive to a read command provided through said signal interface for selecting a particular processed image signal stored in said image memory section, and for restoring the processed image signal either to its original state as an image signal or to another processed state.

40. A digital storage device as claimed in claim 39 wherein the read command is provided by the camera.

41. A digital storage device as claimed in claim 39 wherein the storage device is further useful with a reader, and wherein the read command is provided by the reader.

42. A digital storage device as claimed in claim 35 wherein said device is a memory card and said image memory section includes integrated circuit memory.

43. A digital storage device as claimed in claim 35 wherein said image memory section includes a magnetic disk.

* * * * *